United States Patent [19]

Bennett

[11] Patent Number: 5,054,573
[45] Date of Patent: Oct. 8, 1991

[54] VEHICLE WITH MULTIPLE DRIVEN AXLES

[75] Inventor: John S. Bennett, Leamington Spa, United Kingdom

[73] Assignee: Massey-Ferguson Services N.V., Netherlands Antilles

[21] Appl. No.: 469,411

[22] PCT Filed: Aug. 14, 1989

[86] PCT No.: PCT/GB89/00948
§ 371 Date: Mar. 30, 1990
§ 102(e) Date: Mar. 30, 1990

[87] PCT Pub. No.: WO90/01430
PCT Pub. Date: Feb. 22, 1990

[30] Foreign Application Priority Data

Aug. 13, 1988 [GB] United Kingdom ............... 8819325

[51] Int. Cl.$^5$ ............................................. B60K 17/35
[52] U.S. Cl. ..................................... 180/244; 180/249; 475/150
[58] Field of Search ............... 180/249, 250, 248, 244; 475/150

[56] References Cited

U.S. PATENT DOCUMENTS

| | | | |
|---|---|---|---|
| 1,341,223 | 5/1920 | Thomas | 475/221 |
| 4,538,700 | 9/1985 | Suzuki | 180/248 |
| 4,669,569 | 6/1987 | Suzuki et al. | 180/249 |
| 4,811,811 | 3/1989 | Bergene | 180/244 |
| 4,883,138 | 11/1989 | Kameda et al. | 180/249 |
| 4,895,217 | 1/1990 | Hueckler et al. | 180/249 X |

FOREIGN PATENT DOCUMENTS

| | | |
|---|---|---|
| 301537 | 10/1981 | Fed. Rep. of Germany . |
| 242536 | 12/1979 | France . |
| 2140104 | 11/1984 | United Kingdom . |
| 2208217 | 3/1989 | United Kingdom . |

Primary Examiner—Kenneth R. Rice
Assistant Examiner—Alan M. Kagen
Attorney, Agent, or Firm—MacMillan, Sobanski & Todd

[57] ABSTRACT

A vehicle such as a tractor having front and rear drive axles with crown wheel and pinions (10 and 11) driven from a prime mover (E) via an inter-axle differential (12). The rear drive axle has left and right hand brakes (40) and the inter-axle differential has a lock (22, 23, 24) for locking-up the differential. The lock is biased to an engaged condition by a spring (25) and an hydraulic actuator (27). A control system (CS) is provided which is arranged to engage the lock (22, 23, 24) when both rear axle brakes (40) are applied.

15 Claims, 2 Drawing Sheets

VEHICLE WITH MULTIPLE DRIVEN AXLES

BACKGROUND OF THE INVENTION

This invention relates to vehicles with multiple driven axles and particularly to agricultural and industrial tractors with front and rear driven axles.

Such tractors conventionally have a clutch for connecting and disconnecting drive to the front axle to switch between two and four wheel drive. This clutch is necessary since it is essential to disconnect drive to the front wheels in certain operating conditions, for example, when the tractor is being driven at speed on a road in order to prevent excessive wear to the tires due to unequal peripheral tire speed.

It is also necessary to dis-engage the clutch when the tractor is required to turn very sharply. In these circumstances, the front wheels have to travel appreciably faster than the rear wheels and the turn is impeded if the front wheels are mechanically driven at the same peripheral speed as the rear wheels.

It is well known on four wheel drive highway vehicles to use a differential between the front and rear axles, thus eliminating the excess tire wear at high speed and the restriction of sharp turns. However, this system is unsatisfactory on a tractor due to the normal variation in front/rear weight distribution, which can vary between 80/20 and 20/80.

It is also known to be advantageous in a tractor provided with rear axle brakes only, to ensure that drive to the front wheels is directly connected to the rear wheels whenever such a tractor is braked in order to ensure that both front and rear axles can contribute to the braking effect via their contact with the ground.

Various systems have therefore been proposed which, for example, take account of the requirement to disconnect front wheel drive at speed on the road and which ensure that when both rear axle brakes are applied drive is automatically connected to the front axle.

Other systems have been proposed which change the gear ratio between the front and rear axles when the tractor is turning sharply; this causes the peripheral speed of the front wheels to increase relative to the rear wheels so that the front wheel drive aids rather than impedes the sharpness of the turn.

It is an object of the present invention to provide a vehicle with multiple driven axles which takes account of the operating conditions of an agricultural or industrial tractor and which obviates the need for a clutch to connect or disconnect drive to the front axle and for an inter-axle ratio changing device to facilitate sharp turns, as discussed above.

SUMMARY OF THE INVENTION

Thus according to the present invention there is provided a vehicle having front and rear drive axles driven from a prime mover via an inter-axle differential, left and right brakes for operation on the rear axle, a locking means for locking-up the inter-axle differential, an actuating means for the locking means and a control system for the actuating means, the control system being arranged to cause the actuating means to engage the locking means when both rear axle brakes are applied.

If the vehicle is a tractor with independently operable left and right brakes, the control system will be arranged not to engage the locking means if only one brake is applied to turn the tractor.

Preferably an operator control is provided to allow a vehicle operator to override the control means to engage or disengage the locking means when he determines that the operating conditions so require.

Preferably in a vehicle such as a tractor, in which the front to rear axle weight distribution is unequal, the inter-axle differential will be of the unequal torque split type in which the torque distribution to the front and rear axles reflects the weight distribution.

If the vehicle is a tractor with implement attachment links movable between a lowered work position and a raised transport position, the control system preferably operates automatically to engage the locking means of the inter-axle differential when the links are in their lowered work position and to disengage the locking means when the links are raised to their transport position.

The control system also preferably operates to disengage automatically the locking means when the vehicle is travelling above a preselected speed. A speed of the order of 14 k.p.h. has been found an appropriate preselected speed for tractors.

If the vehicle has an inter-wheel differential on each axle at least one of these inter-wheel differentials may also be provided with its own locking means which may be arranged to operate in unison with the inter-axle differential locking means under the control of the same control system.

The actuating means for the locking means of the inter-axle differential may include spring means to bias the locking means into its engaged condition so that the locking means is automatically engaged should any failure occur in the control system or the actuating system.

BRIEF DESCRIPTION OF THE DRAWINGS

One embodiment of the present invention will now be described, by way of example only, with reference to the accompanying drawings in which.

DETAILED DESCRIPTION OF THE PREFERRED EMBODIMENT

Figure 1:
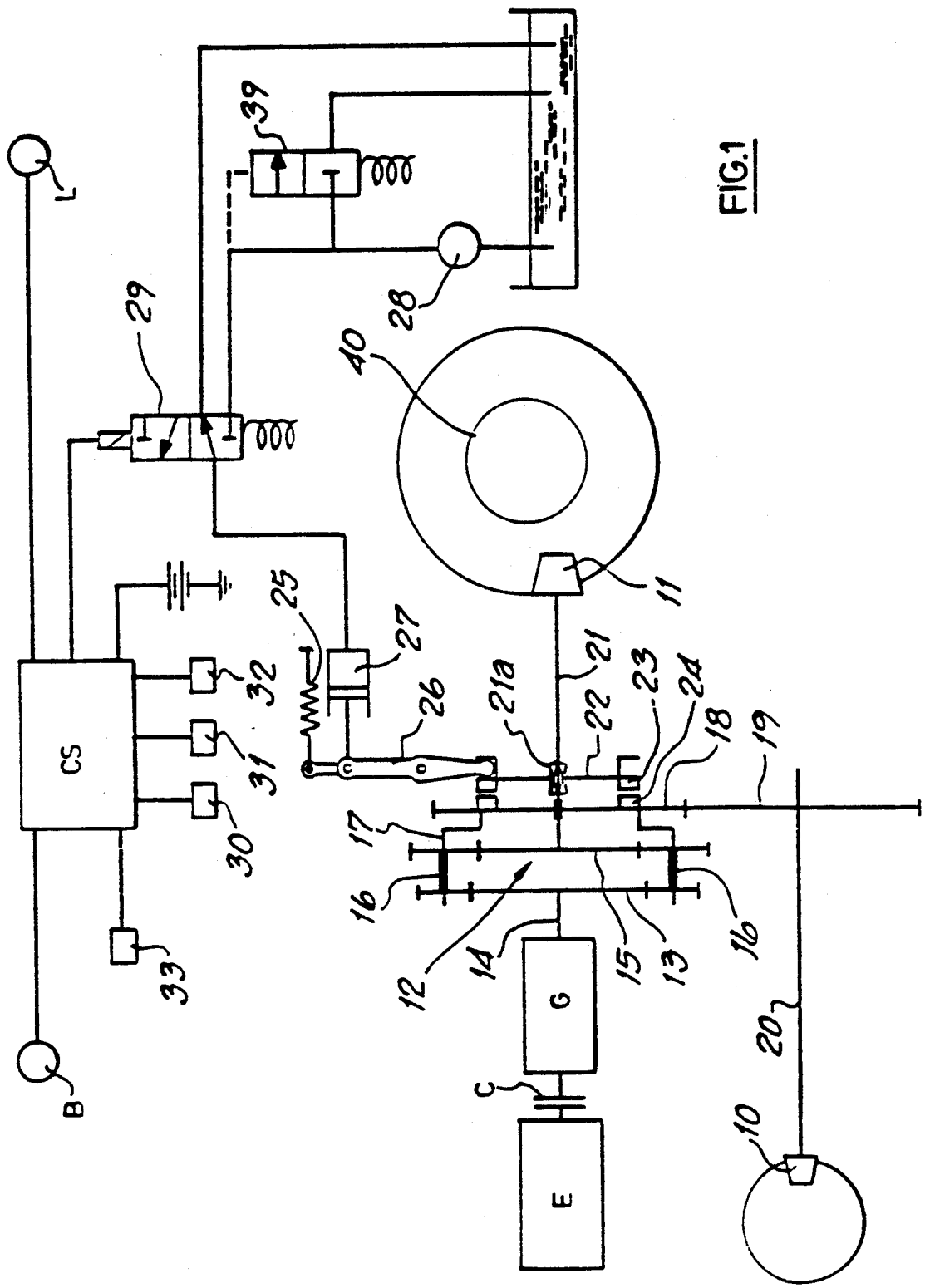
FIG. 1 is a schematic representation of a tractor embodying an inter-axle differential lock control arrangement in accordance with the present invention.

Referring to FIG. 1, this shows a tractor in which an engine E drives a front axle (represented by a crown wheel and pinion 10) and a rear axle (represented by a crown wheel and pinion 11) via an inter-axle differential 12, a gearbox G and a main drive clutch C. Each axle carries ground engaging wheels (not shown) with tires.

The tractor is provided with right and left separately operable brakes (indicated schematically at 40) associated with the right and left sides of the rear axle of the tractor. In the conventional manner these brakes are operated by independent right and left brake pedals (not shown) to allow the application of one brake only in order to facilitate turning of the tractor. As is normal for road use of the tractor, these two brake pedals are connected so that both right and left rear axle brakes must be applied simultaneously.

The tractor is also provided with conventional rear implement attachment links (not shown).

The inter-axle differential 12 comprises an input sun gear 13 driven from a gearbox output shaft 14, an output sun gear 15, orbiting compound planet gears 16, meshing with sun gears 13 and 15 and a planet gear carrier 17, which carries a front axle drive gear 18 which meshes with a gear 19 on a front axle drive shaft 20. Drive to the rear crown wheel and pinion 11 is via a shaft 21 connected with output sun gear 15.

The inter-axle differential gear 12 also includes a locking means in the form of a dog clutch member 22, which is axially slidable on splines 21a on shaft 21 and has teeth 23 engageable with corresponding dog teeth 24 formed on planet carrier 17. As will be appreciated when the teeth 23 and 24 are engaged, the sun gear 15 is in fact locked against rotation relative to the planet carrier 17 so that the entire inter-axle differential 12 rotates as a single unit, thus providing a rigid drive connection between shafts 14, 21 and 20.

The teeth 23 and 24 are arranged to be biased into engagement by a spring 25 which acts on the clutch member 22 via a lever 26. The inter-axle differential is disengaged by the application of fluid under pressure to an actuator 27 acting on lever 26. The actuator 27 may be, for example, hydraulically or pneumatically operated.

In the illustrated example, the actuator 27 is supplied with pressurized hydraulic fluid by a pump 28 via a solenoid operated control valve 29. A pressure relief valve 39 controls the level of hydraulic pressure in the pump circuit. Control valve 29 is itself controlled by an electronic control system CS shown diagrammatically in FIG. 1 whose control criteria are discussed below. If any failure occurs in actuator 27 or the associated hydraulic or electrical circuitry the teeth 23 and 24 are automatically engaged by spring 25.

The tractor is also provided with an operator controlled press button B, which is of the push-on push-off type which allows the operator to override the control system CS to engage or disengage the inter-axle differential lock when he judges that the operating conditions of the tractor require him to intervene. An indicator light L is also provided to indicate to the operator when the inter-axle differential lock is engaged.

In addition to the input from switch B, the Control System also receives inputs from various sensors 30, 31, 32, 33, etc. which indicate various operating parameters of the tractor such as right and left brake application (sensors 30 and 31), tractor forward speed (sensor 32) and the position of the tractor implement attachment links (sensor 33). Since the actual constructional details of sensors 30, 31, 32, 33, etc. form no part of the present invention, no further details of these sensors will be given. Any one of the many well-known sensors capable of sensing each parameter may be used.

The control system CS controls the inter-axle differential locking means in accordance with the following criteria.

When the engine E is started up the actuator 27 is depressurized, thus allowing spring 25 to engage the differential lock 22, 23, 24.

As previously indicated, whenever the operator control button B is pressed this enables the tractor operator to override the command currently being issued by the control system CS if he feels that an override is necessary.

Whenever both left and right rear axle brakes are applied simultaneously (sensed by sensors 30 and 31) the actuator 27 is again depressurized) to engage the differential lock 22, 23, 24 to provide a rigid drive connection between the front and rear axle crown wheel and pinion assemblies 10 and 11, so that both axles can contribute to the braking effect via the contact of their associated wheels with the ground. If either the right or left brake is operated independently (indicating a requirement for a tight turn) the differential lock is unlocked by pressuring actuator 27.

When the implement attachment links are in their working positions (sensed by sensor 33) the actuator 27 is again depressurized to engage the differential lock since under these working conditions it is desirable to lock the differential action between front and rear axle drive shaft 20 and 21 to prevent excessive wheelslip in bad ground conditions. When the implement attachment links are raised to their transport condition (again sensed by sensor 33) indicating that the implement is now no longer in actual use, the actuator 27 is pressurized to disengage the differential locking means.

Additionally, if the tractor is travelling above a preselected speed of say 14 k.p.h. (sensed by sensor 32), actuator 27 is arranged to be pressurized if it is not already in this condition to prevent excessive tire wear due to possible unequal peripheral tire speed of the front and rear wheels which might arise if no differential action is allowed between the front and rear drive shafts 20 and 21.

As will be appreciated in the described tractor application, the front and rear axles have their own inter-wheel differentials provided by the crown wheel and pinion assemblies 10 and 11 respectively. One or both of these inter-wheel differentials may be provided with a locking means controlled in unison with the locking means of the inter-axle differential 12 by the control system CS.

In a vehicle such as a tractor, the weight distribution between the front and rear axles is normally far from equal with the majority of the weight being taken on the rear axle. In these circumstances, the inter-axle differential 12 is arranged to provide an unequal torque split to the front and rear crown wheel and pinion assemblies 10 and 11 respectively. This torque split is arranged to reflect the relative weight distribution on the front and rear axle. Typically the torque split may be 30–70 in favor of the rear axle.

If the tractor is fitted with a means for determining wheel slip relative to the ground (as for example provided on the Massey-Ferguson "Datatronic" tractors), the control system CS may be arranged to ensure depressurization of actuator 27 at slip levels above a preset limit (say 15% slip) to engage the locking means of the inter-axle differential 12 and the inter-wheel differentials 10 and 11.

As will be appreciated, not all the above control criteria need be employed in any one system and the most basic system need only employ the brake application criteria.

Also the control system of the present invention may be integrated into a larger control system controlling other parts of the vehicle, such as that provided on the previously mentioned Massey-Ferguson "Datatronic" tractors.

Figure 2:
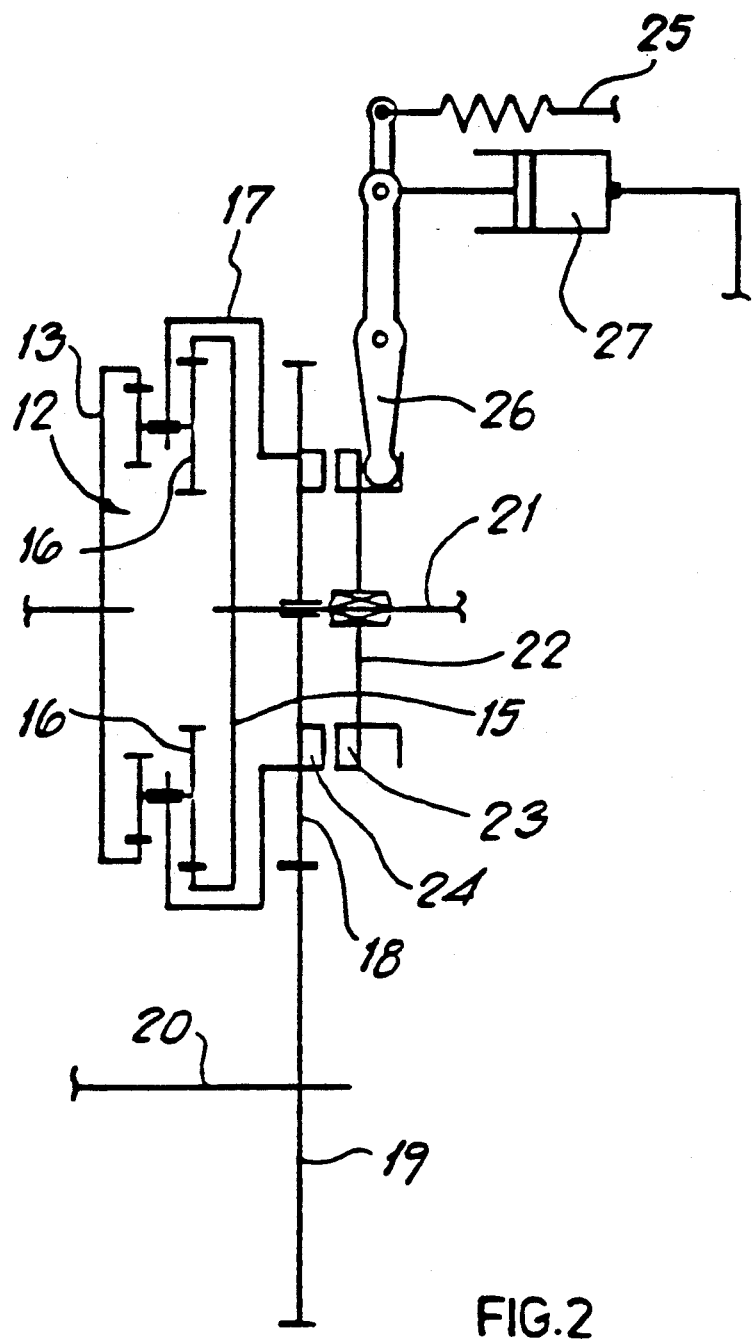
FIG. 2 is a schematic representation of an alternative inter-axle differential arrangement for use in the tractor of FIG. 1.

FIG. 2 shows an alternative inter-axle differential arrangement in which components of a similar function to those shown in FIG. 1 have been similarly numbered. As can be seen from FIG. 2, the input gear 13 to the inter-axle differential is increased in diameter and is internally toothed to engage the planet gears 16 externally as is the output gear 15. This alternative gear arrangement is designed to minimize the loading on the teeth of the differential gear elements by maximizing the radius of gears 13 and 15 respectively. It must be remembered here that that space available for fitting the inter-axle differential 12 is often limited by the close proximity of other parts of the tractor and the use of this alternative gear arrangement maximizes the radius of gears 13 and 15 within the available space.

I claim:

1. A four wheel drive system for a vehicle comprising:
   a prime mover;
   front and rear axle drive shafts;
   inter-axle differential means connected to said prime mover for rotating said front and rear axle drive shafts, said inter-axle differential means being operable in a locked mode, wherein said front and rear axle drive shafts are locked for rotation at the same speed, and an unlocked mode, wherein said front and rear axle drive shafts are capable of rotating at different speeds;
   front axle means connected to said front axle drive shaft for rotating left and right front wheels;
   rear axle means connected to said rear axle drive shaft for rotating left and right rear wheels;
   independently operable left and right brakes for independently braking the rotation of said left and right rear wheels, respectively; and
   means responsive to the concurrent actuation of both of said left and right brakes for causing said inter-axle differential means to operate in said locked mode.

2. The invention defined in claim 1 wherein said means responsive to the concurrent actuation of both of said left and right brakes includes an electronic control system for controlling the operation of said inter-axle differential means.

3. The invention defined in claim 2 wherein said means responsive to the concurrent actuation of both of said left and right brakes further includes sensor means responsive to the actuation of said left and right brakes for generating electrical signals to said electronic control system.

4. The invention defined in claim 3 wherein said sensor means includes first and second sensors responsive to the actuation of said left and right brakes, respectively, for generating electrical signals to said electronic control system, said electronic control system being responsive to the generation of electrical signals from both of said first and second sensors for causing said inter-axle differential means to operate in said locked mode.

5. The invention defined in claim 1 further including means for selectively causing said inter-axle differential means to change its mode of operation from said locked mode to said unlocked mode and from said unlocked mode to said locked mode.

6. The invention defined in claim 5 wherein said means for selectively causing said inter-axle differential means to change its mode of operation includes an electronic control system for controlling the operation of said inter-axle differential means and manually operable means for generating an electronic signal to said electronic control system to effect said change of mode of operation.

7. The invention defined in claim 1 further including means responsive to the speed of the vehicle for causing said inter-axle differential means to operate i said unlocked mode when the speed of the vehicle exceeds a predetermined value.

8. The invention defined in claim 7 wherein said means responsive to the speed of the vehicle includes an electronic control system for controlling the operation of said inter-axle differential means and sensor means for generating an electronic signal to said electronic control system which is representative of the speed of the vehicle.

9. The invention defined in claim 1 wherein one of said front and rear axle means includes a selectively lockable inter-wheel differential means, and wherein said means responsive to the concurrent actuation of both of said left and right brakes causes both said inter-axle differential means and said inter-wheel differential means to operate in said locked mode.

10. The invention defined in claim 9 wherein both of said front and rear axle means include a selectively lockable inter-wheel differential means, and wherein said means responsive to the concurrent actuation of both of said left and right brakes causes said inter-axle differential means and both of said inter-wheel differential means to operate in said locked mode.

11. The invention defined in claim 1 further including means responsive to the position of an implement connected to the vehicle for causing said inter-axle differential means to operate in said locked mode when the implement is in a predetermined position.

12. The invention defined in claim 11 wherein said means responsive to the position of the implement includes an electronic control system for controlling the operation of said inter-axle differential means and sensor means for generating an electronic signal to said electronic control system which is representative of the position of the implement.

13. The invention defined in claim 1 wherein said inter-axle differential means includes an input sun gear connected to said prime mover, an output sun gear connected to one of said front and rear axle drive shafts, and a carrier connected to the other of said front and rear axle drive shafts, said carrier carrying a plurality of planet gears meshing with both of said input and output sun gears.

14. The invention defined in claim 13 wherein said inter-axle differential means further includes means for selectively connecting said output sun gear to said carrier for causing said inter-axle differential means to operate in said locked mode.

15. The invention defined in claim 14 further including means for normally maintaining said inter-axle differential means in said locked mode.

* * * * *